March 3, 1959   H. A. GEISLER ET AL   2,876,069
FREEZE PREVENTION IN JET AIRCRAFT PURGE GAS GENERATORS
Filed March 5, 1953
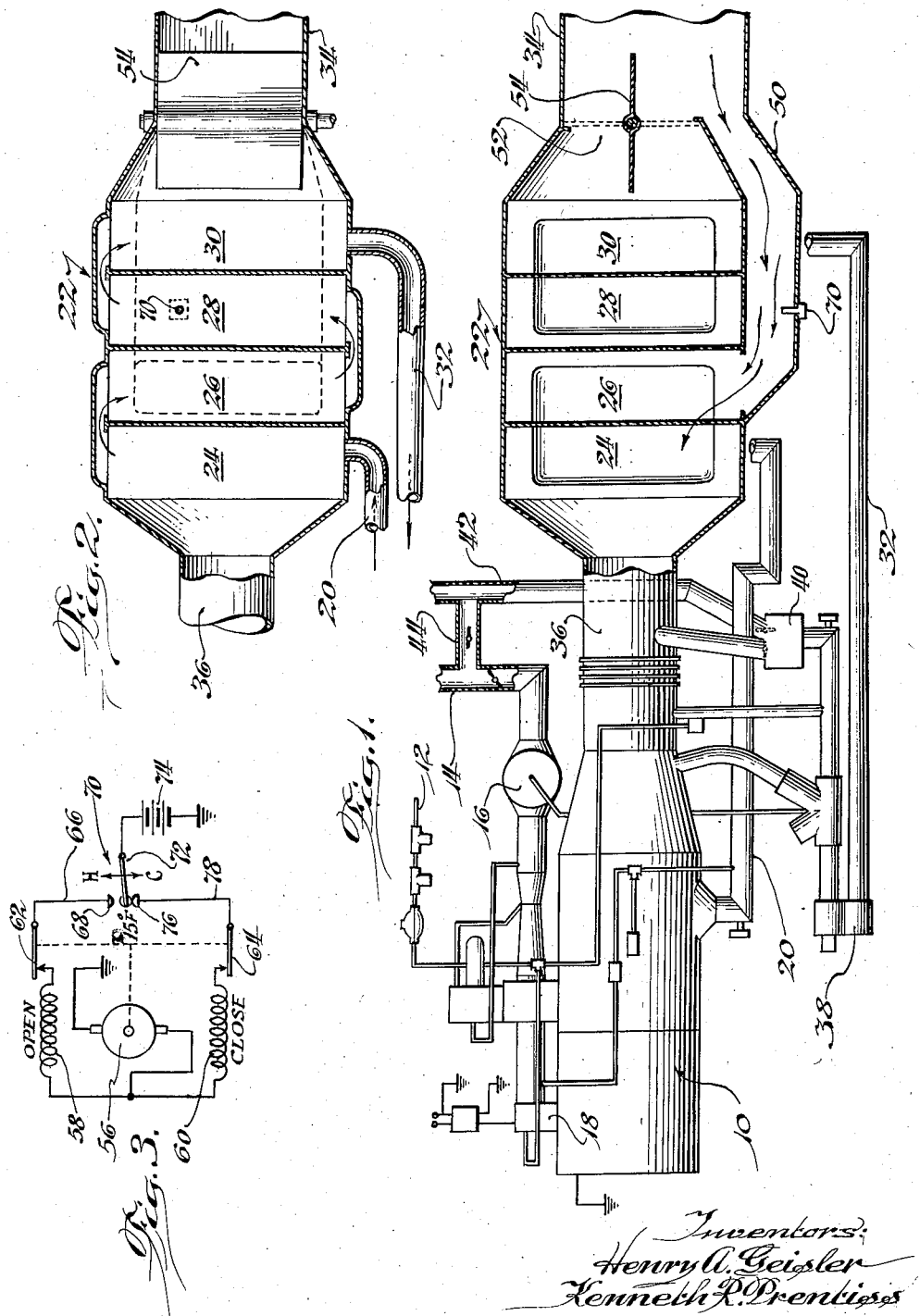

2,876,069
Patented Mar. 3, 1959

2,876,069

FREEZE PREVENTION IN JET AIRCRAFT PURGE GAS GENERATORS

Henry A. Geisler and Kenneth R. Prentiss, Indianapolis, Ind., assignors to Stewart-Warner Corporation, Chicago, Ill., a corporation of Virginia Application March 5, 1953, Serial No. 340,632

1 Claim. (Cl. 23—181)

The present invention relates to purge gas generators for jet aircraft, and more particularly to the prevention of freezing in such generators under flight conditions where freezing would otherwise take place.

As is more completely described in the copending application of Donald A. Potter and Henry A. Geisler, Serial No. 324,974, filed December 9, 1952, now Patent No. 2,759,802, issued August 21, 1956, and assigned to the same assignee of record as the present application, there is much closed space within any aircraft which is not occupied by personnel and in which explosions or fires may occur. This is because accident or damage may permit fuel to leak from the fuel cells or lines into these spaces and mix with atmospheric air. Also, of course, the vapor and air mixture above the fuel within the cells will be combustible under some conditions. This is a more hazardous condition with jet engine fuels than it is with gasoline as is pointed out in the before mentioned application.

In the above mentioned copending application a complete system for maintaining all such spaces under slight positive pressure with an inert gas is explained and illustrated. In general, the principle involved is to form a combustible mixture of the aircraft fuel and air in a special sealed burner, and to burn this mixture under carefully controlled conditions so as to obtain products of combustion which are rich in nitrogen and carbon dioxide with only slight traces of oxygen being present. This gas mixture is then cooled and treated to remove the major portion of the water formed as a product of combustion and any corrosive elements similarly formed, before passing the gases to the spaces to be purged.

In any such system, considerable water of combustion is condensed from the gases during the cooling step and can subsequently be separated in its liquid phase. There is danger under some conditions, however, that excessive cooling of the products of combustion may reduce their temperature below the freezing point of water, with the result that water condensed out of the products of combustion may freeze within the heat exchanger, the subsequent passages or the spaces to be purged, thereby causing malfunctioning of the apparatus. One system for preventing such freezing is described and illustrated in the previously referred to copending application, and the primary objective of the present invention is to provide an alternative method and structure for dealing with this freezing problem.

Because of the general similarity of the present apparatus to that described in the previously referred to copending application, the equipment of the present invention need not be described in detail and therefore will be outlined only briefly, the detailed discussion being reserved for the portions of the present apparatus which differ over that of the above mentioned copending application.

It is one of the objects of the present invention to provide a novel, simple and effective means for preventing freezing in the combustion gas passages of an aircraft purge gas generator under a wide variation in circumstances.

A further object is to accomplish the above with a minimum of equipment already available in a jet powered aircraft.

Other objects and advantages will become apparent from the following description of a preferred embodiment of our invention which is illustrated in the accompanying drawings, in which:

Figure 1 is a diagrammatic representation of a purge gas generator in which features of the present invention have been embodied;

Fig. 2 is a diagrammatic representation of the right hand portion of the apparatus illustrated in Fig. 1, and differs from Fig. 1 in that the view is taken at right angles thereto; and Fig. 3 is a simplified electrical circuit diagram of the freeze prevention apparatus.

Referring now to Fig. 1 of the drawings, the apparatus generally comprises a burner and primary heat exchanger indicated at 10, which receives fuel from a line 12 having fuel flow regulating accessory equipment associated therewith, and air by way of a line 14. Ordinarily the line 14 will receive air under pressure from the compressor of the jet engine. The air flows to the burner by way of a flow regulator 16, the air entering the enclosure at 18. Within the assembly indicated generally at 10, the fuel and air are mixed, are ignited and burned to produce products of combustion which have their temperature reduced considerably by a primary heat exchanger associated directly with the burner. From this primary heat exchanger the tempered products of combustion leave by way of the duct 20 and pass to a secondary heat exchanger 22. These hot gases will arrive at the secondary heat exchanger at temperatures which may under some circumstances be as high as 1800° F.

Within the secondary heat exchanger the products of combustion make four passes indicated at 24, 26, 28 and 30 through four groups of tube bundles, with the products of combustion exhausing from the last pass 30 by way of a duct 32. Ambient air collected by a scoop or ram in the aircraft slip stream for cooling the two heat exchangers enters the secondary heat exchanger by way of a shroud or adapter 34 and passes toward the left across the tube handles 30, 28, 26 and 24 in that order and thence through a transition section 36 to the primary heat exchanger associated directly with the burner and within the structure indicated at 10, the heated air issuing from the left hand end of the assembly 10 and passing overboard through a duct not shown. Within the duct 32 the products of combustion are cool and a large portion of the water of combustion is in the liquid phase. It is therefore easily separated from the gas stream by a carbon and water cyclone type separator indicated at 38, the gas then passing through a valve box 40 to the outlet duct 42 which leads to the spaces to be purged. In order to permit air from the source which is connected to the equipment at 14 to flow to the fuel cells when the purge gas generator is not operating, a bypass valve is provided at 44 between the inlet air duct 14 and the outlet gas duct 42.

From the above it will be seen that during normal operation of the system, air entering from the shroud 34 passes into the casing of the secondary heat exchanger 22 and in succession comes into heat exchange contact with the tube bundle groups 30, 28, 26 and 24. With this counterflow arrangement, both the air and gas are at their lowest temperatures at the tube bundle pass 30. Under some conditions the ambient air entering the exchanger from the shroud 34 will be at a very low temperature and therefore under some conditions the products of combustion in the last pass 30, or possibly the last two passes 28 and 30, may be cooled below the freezing point, with the result that the tubes may become plugged with ice. If the temperatures are only marginally above these, ice may not form within the tubes at 28 and 30, but the gases leaving the heat exchanger by the duct 32 will be so close to the freezing point that freezing may take place within the spaces to be purged or the lines to these spaces. To be safe against this latter possibility the gases arriving at the spaces to be purged should be at a temperature no lower than 40° F.

By referring particularly to Fig. 1, it will be seen that there is a bypass duct 50 which extends along one side of the heat exchanger 22 so as to connect the shroud 34 with the interior of the secondary heat exchanger 22 air passage at the location of the second tube bundle pass 26. Air flowing through the bypass 50, therefore, will cool only the gas passes 26 and 24 which contain the hot products of combustion at the highest temperature prevailing in the secondary heat exchanger. In addition, the mouth of the main entrance of the air to the heat exchanger indicated at 52 is equipped with a damper or valve 54 which is operated by an electric motor 56 of the reversing type.

As is best seen in Fig. 3, the motor 56 is provided with a circuit 58 which operates to drive the motor 56 in such direction as to open the valve 54 when the circuit is energized. Similarly, a second circuit 60 closes this valve when energized. The windings 58 and 60 receive energy by way of a pair of single pole, single throw limit switches 62 and 64, respectively, which are normally closed. These switches are connected to be operated by the motor 56, however, such that whenever the motor has driven the valve 54 to such position that the valve is opened completely, the switch 62 will be opened, thereby deenergizing the opening motor circuit 58. Similarly, when the motor 56 is energized to run in the opposite direction to close the valve 54, the switch 62 is soon closed and the switch 64 will be opened when the valve 54 has reached closed position.

The switch 62 is energized by a lead 66 connected to one of the stationary contacts 68 of a single pole, double throw, thermostatic switch 70, the movable switch element 72 of which is connected to one side of the airplane electric circuit indicated at 74, the other side of which is grounded. The other stationary contact 76 of the thermostatic switch 70 is conencted by a lead 78 to the switch 64 in the motor closing circuit. The thermostatic switch 70 is so oriented that when it is heated to a temperature above approximately 15° F. the blade 72 moves so as to bring its contact against contact 68. Below approximately this temperature the switch blade 72 moves in the opposite direction so as to come against contact 76.

The thermostatic switch 70 is arranged to be sensitive to the temperature of the incoming cooling air and conveniently can be mounted in the bypass duct 50 through which air flows continuously.

The system operates in the following manner: When the temperature of the air entering by way of the shroud 34 is above approximately 15° F. the valve 54 will be open thereby permitting the major portion of the cooling air to flow directly to the last secondary heat exchanger pass 30 and thence through the remaining portion of the heat exchanger by way of passes 28, 26, 24 to the transition section 36 from which it enters the primary heat exchanger in the structure indicated at 10. Meanwhile a portion of the air from the shroud 34 will be diverted by way of the bypass 50 so as to enter the secondary heat exchanger at the tube bundle pass 26 thereby producing no cooling effect upon the last passes 30 and 28. Under these conditions, that is, with the temperature of the cooling air above 15° F. at the point where it enters the heat exchanger, the temperature of the products of combustion leaving by way of the duct 32 will be sufficiently above 40° F. so as to insure a temperature in the spaces to be purged that will be safely above freezing. Whenever the temperature of the incoming air drops below 15° F., the thermostatic switch 70 will be actuated so as to shift its contact 72 away from contact 68 and against contact 76. This energizes the motor closing circuit 60 by way of the switch 64 and drives the motor 56 until the valve 54 has reached closed position. As soon as this position has been reached the limit switch 64 will be opened thereby deenergizing the motor circuit 60 so as to permit the valve 54 to remain in the closed position. Under these conditions all of the cooling air must flow by way of the bypass 50 and thereby enters the secondary heat exchanger 22 at the tube bundle 26. It therefore produces no cooling effect upon the last two passes 28 and 30, with the result that the products of combustion leaving the last pass 30 by way of the duct 32 will be at a temperature safely above 40° F. even though the air entering by way of the shroud 34 is extremely cold.

Although this invention has been described in conjunction with a specific system, it will be appreciated that depending upon the conditions prevailing in the particular installation and to some extent also upon the design of the equipment, it will be necessary to have the bypass 50 connected to the heat exchanger 22 or its equivalent at some other position. As an example, it is contemplated that under certain conditions the bypass duct 50 could well be connected to the heat exchanger 22 at the first pass 24 rather than at the second pass 26. Similarly, under certain other conditions it would be advisable to connect the bypass 50 to the third pass 28.

Essentially the main feature of the invention is the arrangement by which under ordinary circumstances all of the cooling surface of the heat exchanger receives cooling air, but that under conditions where the temperature of the incoming air is below a certain limit, the cooling air will be diverted so as to pass over only a portion of the cooling surface thereby in effect reducing the efficiency of the heat exchanger enough to compensate for the extremely low temperature of the cooling air.

Having described our invention, what we claim as new and useful and desire to secure by Letters Patent of the United States is:

In a purge gas generating system for use in aircraft which have a purge gas conduit leading to spaces to be purged and an air compressor for supplying air at high temperatures and pressures, the combination comprising, means forming an air conduit having an inlet adapted for connection to the compressor to receive said high pressure, high temperature air, said air conduit having an outlet connection, combustion chamber means having a combustion air inlet, a fuel inlet and an outlet for products of combustion, said combustion chamber air inlet being connected to said air conduit outlet, means for supplying fuel to said fuel inlet, means forming a heat exchanger enclosure, wall structure dividing the enclosure into a pair of passages each having an air inlet and an air outlet, means defining a plurality of gas passes connected in series in one of the passages in heat exchange relation with air flowing through the one passage, means connecting one end of the series to said combustion chamber outlet, means for connecting the other end of the series to said purge gas conduit, the outlet of the other passage comprising aperture means in the wall structure opening to a portion of the one passage at a point intermediate the first and last gas passes, means connected to the inlets of both passages for supplying cooling air thereto, valve means for closing the inlet of the one passage, and means responsive to the temperature of the cooling air to urge the valve towards closed position when the temperature of the cooling air drops below a predetermined temperature, indicative of an approach to freezing conditions at a selected place in the system, to permit heat exchange between cooling air and less than all of the gas passes.

References Cited in the file of this patent

UNITED STATES PATENTS

| | | |
|---|---|---|
| 1,952,005 | Willenborg | Mar. 20, 1934 |
| 1,960,212 | Walker | May 22, 1934 |
| 2,037,158 | Doelling | Apr. 14, 1936 |
| 2,080,102 | Willenborg | May 11, 1937 |
| 2,142,545 | Willenborg | Jan. 3, 1939 |
| 2,507,044 | Palmatier | May 9, 1950 |
| 2,563,054 | Messinger et al. | Aug. 7, 1951 |
| 2,645,080 | Newcomb | July 14, 1953 |
| 2,677,932 | Forsling | May 11, 1954 |
| 2,743,997 | Geisler | May 1, 1956 |
| 2,746,245 | Geisler | May 22, 1956 |